United States Patent [19]

Fischer

[11] Patent Number: 4,502,822
[45] Date of Patent: Mar. 5, 1985

[54] MACHINE FOR THE PRECISION WORKING OF TOOTH SURFACES OF TOOTHED WORKPIECES

[75] Inventor: Heinrich Fischer, Munich, Fed. Rep. of Germany

[73] Assignee: Carl Hurth Maschinen- und Zahnradfabrik GmbH & Co., Munich, Fed. Rep. of Germany

[21] Appl. No.: 467,425

[22] Filed: Feb. 17, 1983

Related U.S. Application Data

[63] Continuation of Ser. No. 129,769, Mar. 12, 1980, abandoned.

[30] Foreign Application Priority Data

Mar. 29, 1979 [DE] Fed. Rep. of Germany ....... 2912545
Jul. 11, 1979 [DE] Fed. Rep. of Germany ....... 2927976

[51] Int. Cl.$^3$ ............................................. B23F 19/06
[52] U.S. Cl. ...................... 409/32; 51/52 R; 72/74; 409/33; 409/37; 409/49
[58] Field of Search .................. 409/2, 31, 32, 33, 34, 409/36, 37, 49; 29/159.2; 72/74, 101, 102; 51/52 R, 72 R, 287

[56] References Cited

U.S. PATENT DOCUMENTS

| | | | |
|---|---|---|---|
| 2,557,462 | 6/1951 | Praey | 409/33 |
| 2,762,268 | 9/1956 | Maurer | 409/32 |
| 3,188,915 | 6/1965 | Hurth | 409/33 |
| 3,272,075 | 9/1966 | Gates et al. | 409/32 |
| 3,552,167 | 1/1971 | Bergi et al. | 29/159.2 X |

FOREIGN PATENT DOCUMENTS 1150558 6/1963 Fed. Rep. of Germany.

Primary Examiner—Z. R. Bilinsky
Attorney, Agent, or Firm—Flynn, Thiel, Boutell & Tanis

[57] ABSTRACT

A machine for the precision working of tooth surfaces on toothed workpieces. The machine has a frame, a rotatingly drivable gearlike tool which is arranged substantially above the workpiece on the frame and structure supporting the tool for movement into a tooth engaging relation with the workpiece. Structure is also provided for adjusting a crossed-axes angle between the tool and the workpiece. Guide structure is provided for effecting a change in the spacing between the geometric centers of the tool and the workpiece during a machining operation. The workpiece is stationarily mounted on the frame and all guideways on the frame required for facilitating an adjustment of the tool and during the working operation are arranged substantially above the workpiece. Additional structure is provided for facilitating an adjustment of the axis of rotation of the tool about both horizontal and vertical axes.

4 Claims, 13 Drawing Figures

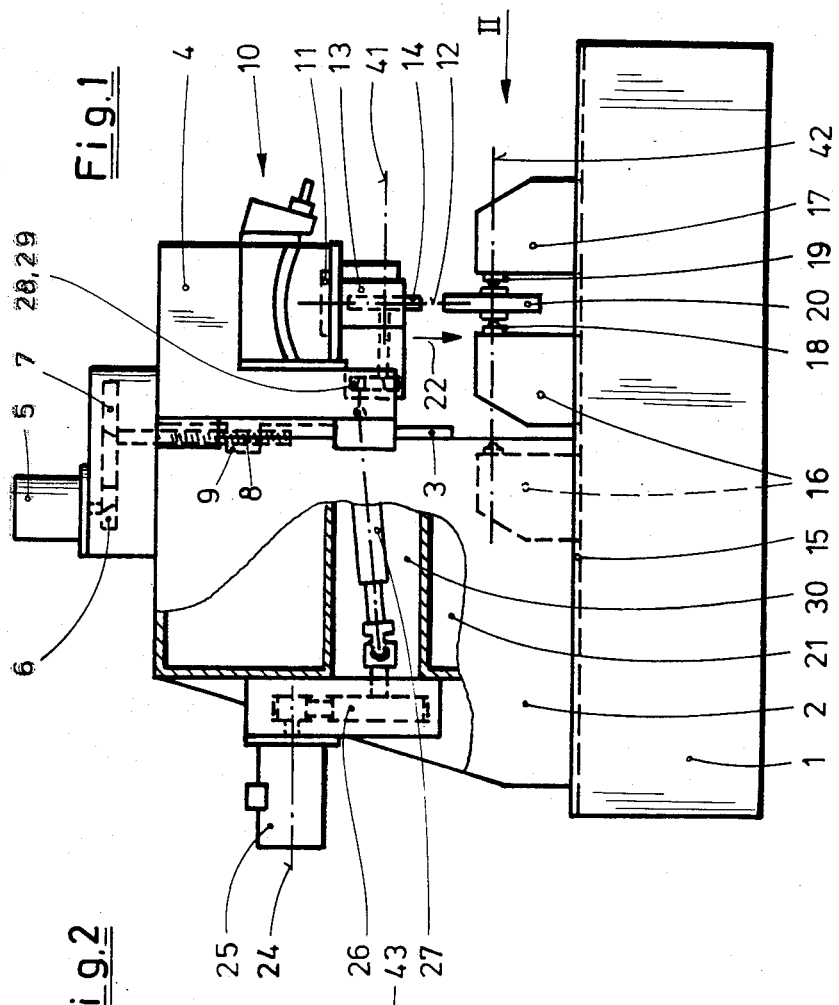
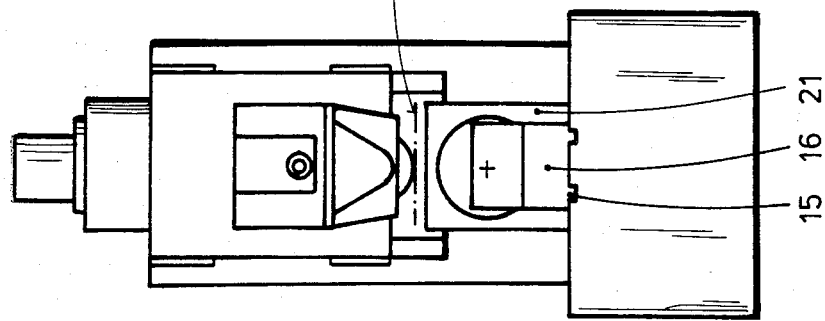

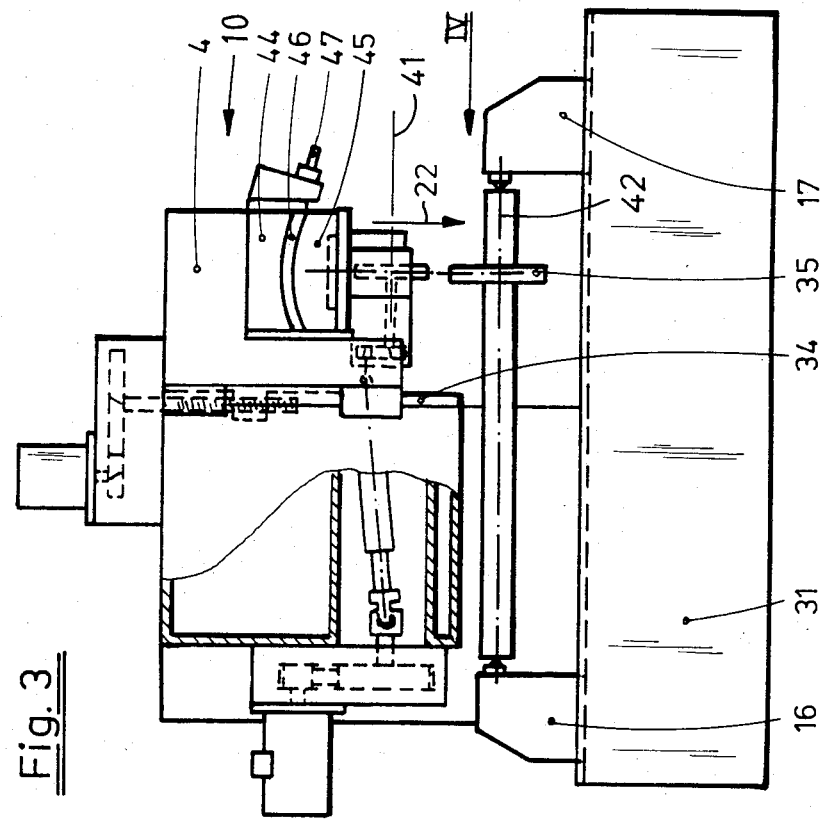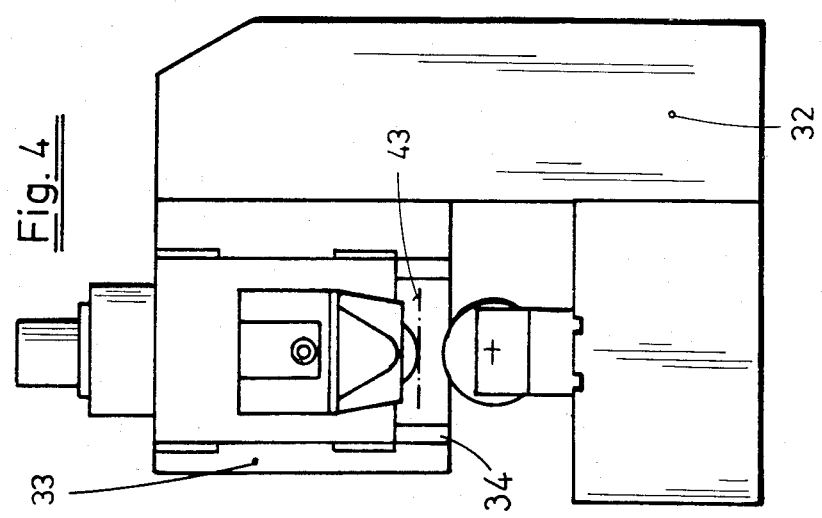

4,502,822

MACHINE FOR THE PRECISION WORKING OF TOOTH SURFACES OF TOOTHED WORKPIECES

This is a continuation of application Ser. No. 129,769, filed Mar. 12, 1980, now abandoned.

FIELD OF THE INVENTION

The invention relates to a machine for the precision working of tooth surfaces of toothed workpieces.

BACKGROUND OF THE INVENTION

In most machines of the mentioned type, the tool is arranged above the workpiece. The tool is also pivotal about a vertical axis to adjust a crossed-axes angle. To transmit the rotary movement from the drive motor to the tool, gear drives are used, which, aside from spur gears, also include pairs of bevel gears. Bevel gears having a quality which is required for precision working machines are expensive to manufacture and their clearance-free installation is very time consuming and, therefore, expensive. The workpiece is clamped in the mentioned machines on a table which is elevationally adjustable in vertical guideways and carries out with said table a movement in the sense of a center distance reduction between the geometric centers of the workpiece and the tool. This movability of the workpiece brings about sometimes difficulties in the case of machines having automatic workpiece-feed devices, in particular when the machines are changed over to different workpieces.

Also a machine has become known, in which the workpiece is arranged stationarily above the tool and all movements which are required for machine adjustment and working are carried out by the tool (German AS No. 1 121 907). A disadvantage of this design is that all guideways facilitating a machine adjustment and—even more—for working lie in the chip area and are thus exposed to the risk of the quick wear.

Therefore, the basic purpose of the invention is to provide a machine, which is suited for an automatic workpiece feed, in which the guideways are arranged mostly outside of the chip area and which has a simple drive arrangement for the tool.

The purpose is inventively attained with a machine having the tool arranged above the workpiece, the workpiece stationarily oriented below the tool, all guideways for guiding the movement of the tool being oriented above the workpiece and the drive for the tool being accomplished without the use of bevel gears. With this design of machine, it is possible to work the most different of workpieces. The stationary mounting on a rigid machine base permits also (1) the working of wave-shaped or undulating surfaces on the workpieces, (2) the tool which carries out all movements to be positioned above the workpiece and thus results in all guideways to be positioned outside of the chip area, and, finally, (3) the free passage of the workpiece under the tool permits a problemless automatic workpiece feed and discharge.

A problemless drive of the tool which is mounted in the movable and position-changeable tool head by a stationarily arranged drive motor occurs in a very advantageous manner through a Cardan shaft. In order to keep the rotary guide for the tool head clearance-free or to a closely specified tolerance and to thus avoid manufacture inexactnesses caused by the combined weight of the tool head, the tool and the drive shaft, the rotary clamping mechanism is initially tensioned in the vertical direction.

While one embodiment of the machine is suited only for precision working methods utilizing a purely radial feed of the tool, thus for example for the plunge shaving, gear rolling and similar methods, the machine is also suitable for other shaving methods, for example the parallel, diagonal or underpass shaving. It is thereby advantageous, if the adjusting carriage is composed of multiple parts, each relatively movable to the other. Gears according to all conventional methods can be shaved on a so-designed machine. If crowned teeth are to be produced, then a guide rule used in association with the adjusting carriage is possible, which guide rule results in a control of the movement of the tool head. This device which is very simple in its design can be enlarged upon in its range of use when wide gears are to be provided with a crowned surface or when teeth having crowning on only one side or other surface characteristics, for example a conical characteristic, are to be produced.

BRIEF DESCRIPTION OF THE DRAWINGS

The invention will be discussed in greater detail hereinafter with reference to FIGS. 1 to 13, in which:

FIG. 1 is a front view of an exemplary embodiment of a machine embodying the invention;

FIG. 2 is a side view in the direction of the arrow II of the machine according to FIG. 1;

FIG. 3 is a front view of a different exemplary embodiment of a machine embodying the invention;

FIG. 4 is a side view in the direction of the arrow IV of the machine according to FIG. 3;

DETAILED DESCRIPTION

Figure 5:
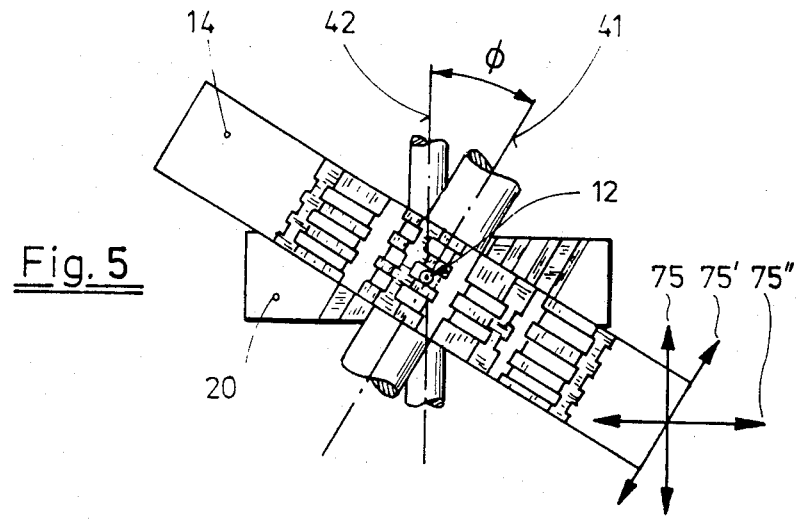
FIG. 5 illustrates a tool which cooperates with the workpiece at crossed axes.

A frame or vertical column 2 is rigidly mounted at one end on a machine base 1 (FIG. 1). A vertical carriage 4, which at least partially projects over the free end portion or other end of the base, is guided for vertical movement on the column 2 in vertically extending slide bars 3 directed toward the free end portion of the base. A stepping motor 5 is arranged on the column 2 for facilitating a driving adjustment of the carriage 4, which stepping motor drives a screw 8 through a spur-gear system 6,7. The screw 8 acts onto a spindle nut 9 which is fixedly connected to the vertical carriage 4. The vertical carriage 4 has on its underside a so-called adjusting carriage 10, which will be discussed below. A tool head 13 is in turn received on the underside of the adjusting carriage 10 in a rotary clamping mechanism 11, which tool head is rotatable about a vertical axis 12. (The axis 12 is identical with the common normal to the tool 14 and the workpiece 20.) A tool 14 is rotatably supported in the tool head 13. The tool 14 may be a conventional plunge shaving gear or a conventional generating gear or a different tool which is suitable for precision working and carries out only a downfeed in the direction of the arrow 22 in FIGS. 1 and 3. The tool projects downwardly from the bottom of the tool head 13.

Two tailstocks 16,17 are longitudinally movably arranged and fixedly positionable on the machine base 1 in longitudinal guideways 15. The devices which are needed for this are known and are, therefore, not illustrated. The tailstocks 16,17 are equipped with also conventional devices which are, therefore, not illustrated in detail, for example spindle sleeves 18,19 for facilitating an automatic chucking of a workpiece 20. In order to facilitate the reception of longer, for example wavelike workpieces between the tailstocks 16,17, the tailstock 16 which is arranged adjacent the column 2 can be moved to the broken-line position in FIG. 1 into a recess 21 in the column 2.

To machine the workpiece 20, the tool 14 approaches the workpiece in the direction of the arrow 22 and engages same. The devices which are provided for this movement, as the stepping motor 5 and the vertical carriage 4, have already been described above. A drive motor 25 is stationarily mounted on the column 2 for providing the rotary drive of the tool 14 through a countershaft 26 and a kinetically uniform Cardan shaft 27 and a spur-gear system 28,29 which is housed in the tool head 13. An electric motor or a regulatable hydraulic motor can be used as the drive motor 25. In some instances the countershaft 26 may possibly not be needed. A channel 30 is provided in the column 2 and the Cardan shaft extends therethrough.

A slightly modified embodiment of the described machine is illustrated in FIGS. 3 and 4. A vertical column 32 has an arm 33 which projects over the machine base 31 and is rigidly mounted to one end of a longitudinal side of the machine base 31. Slide bars 34 are arranged on said arm 33 and extend vertically toward the free end portion of the machine base 31 and support the vertical carriage 4 for vertical movement as described above. The drive for the vertical carriage, the arrangement of the so-called adjusting carriage 10 and of the tool head 13 and the drive for the tool 20 correspond to the structure of FIG. 1. The arrangement of the column 32 next to the machine base 31 permits the utilization of the entire length of the machine base for the provision of the guideways 15 of the tailstocks 16,17, to render it possible to work on very long workpieces 35. An automatic workpiece feed and discharge is then, however, only possible from the free longitudinal side, namely, the front side of the base 31.

Especially in the case of longer workpieces, the risk exists of causing a bending of the workpiece under the machining pressure. The axes 41 and 42 of tool and workpiece, respectively, extend then no longer in parallel planes. In order to be able to balance this workpiece engagement (or, however, also in order to be able to produce a slightly conical tooth system), the tool 14 is pivotal about a horizontal axis 43 (FIG. 4). The axis 43 extends approximately in the tooth engagement region and perpendicularly with respect to the common normal 12 of tool and workpiece and also perpendicularly with respect to the workpiece axis 42. Pivoting of the tool 14 about the said axis 43 is made possible by the so-called adjusting carriage 10 being divided: its upper part 44 being rigidly mounted on the vertical carriage 4, its lower part 45, which receives the tool head 13 in the rotary clamping mechanism 11 is received in a rotary clamping mechanism 46 which is needed only as a section of an arc. The lower part 45 of the adjusting carriage 10 with the tool head 13 and the tool 20 is pivotal about the axis 43 and fixably securable in the rotary clamping mechanism 46. A crank or the like, which is not illustrated, can be mounted on the free end of a spindle 47 for rotating same. A worm is secured to the spindle and engages a corresponding worm-gear segment on the lower part 45. The worm and worm gear are not illustrated since they are conventional elements. The same is true for the means which are provided for clamping the lower part in the adjusted position.

Figure 6:
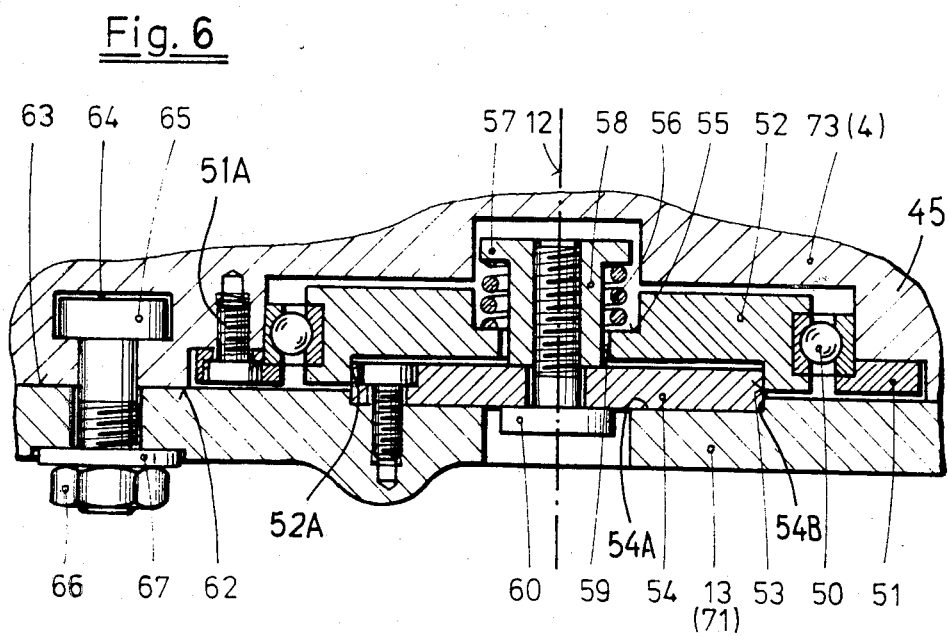
FIG. 6 is a cross-sectional view of a rotary clamping mechanism for the tool head.
Figure 7:
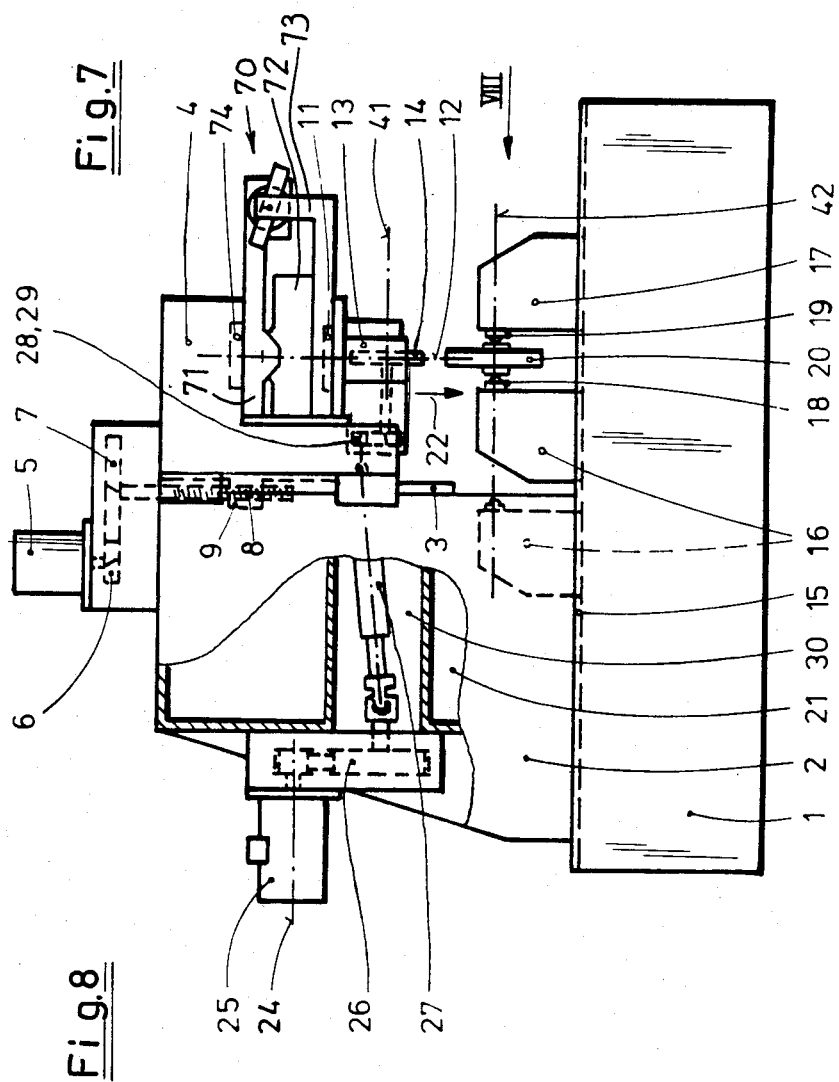
FIG. 7 is a front view of a further exemplary embodiment of a machine embodying the invention.
Figure 8:
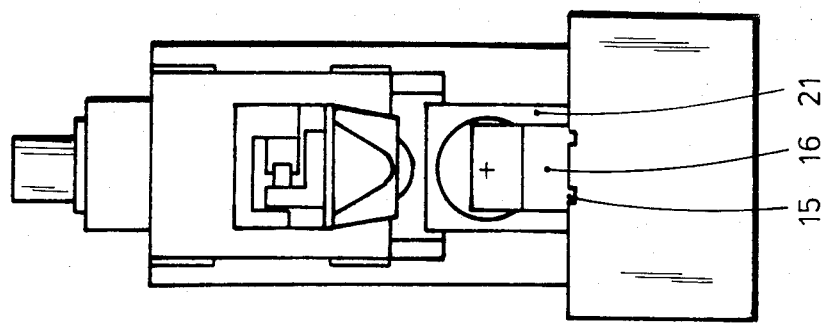
FIG. 8 is a view of the same machine in the direction of the arrow VIII in FIG. 7.

As already mentioned, the tool head 13 is pivotal about a vertical axis in a rotary clamping mechanism 11 in the so-called adjusting carriage 10 or in its lower part 45. Thus a crossed-axes angle $\phi$ (FIG. 5) between the tool axis 41 and the workpiece axis 42 can be adjusted. The inclination of the tool axis 41 with respect to the motor axis 24, which inclination exists then at the same angle in a horizontal plane, is coupled by the Cardan shaft 27 as the different elevational positions of the tool axis 41 change with respect to the motor axis 21 due to different workpiece dimensions and to vertical movements of the tool during each working cycle. In order to prevent a sagging of the tool head 13 in the rotary clamping mechanism 11, a roller support which is initially tensioned by a spring 56 is provided in the rotary clamping mechanism (FIG. 6). A retaining ring 51 aided by screws 51A holds the outer race of a ball bearing 50 to the lower part 45 of the so-called adjusting carriage 10. The inner race of the ball bearing is mounted on a support ring 52 having a central recess 52A in the bottom thereof wherein the circular wall 53 is concentric with the common normal 12. The tool head 13 has a recess 54A in the top thereof wherein the circular wall 54B is concentric with the common normal 12 and axially aligned with the wall 53. A centering ring 54 is provided which has an annular surface engaging both the walls 53 and 54B. A screw 54C effects a securement of the ring 54 to the tool head 13. Concentrically with the inner centering surface 53, the support ring 52 has a recess 55 in the upper surface thereof, in which a spring 56 is axially disposed. The end of the spring 56 remote from the support ring 52 engages a radially outwardly extending spring plate 57 on an internally threaded sleeve 58 which extends through the center of the spring and a bore 59 in the support ring 52 at the bottom of the recess 55. A screw 60 has an enlarged head engaging the bottom of the centering ring 54 and is threadedly engaged with the internal thread of the sleeve 58 to initially tension the spring 56. To assure that the tool head 13 rests with its upper planar surface 62 always on the lower planar surface 63 of the lower part 45 so that there is no axial play active in the bearing 50, the initial tensioning force of the spring 56 must be greater than the downwardly directed force, which results from the weight of the tool head 13 including the tool 20 and the proportionate weight of the Cardan shaft 27. Screws 65 are arranged in an annular groove 64 in the lower part 45, the lower ends of which project through an opening in the tool head 13. Nuts 66 and washers 67 are secured to the screws 65 and serve to lock the tool head 13 in the necessary angular position $\phi$.

The stepping motor 5 assures the feeding of the tool toward and away from the workpiece in the sense of a reduction or enlargement of the spacing between the geometric centers of the workpiece and the tool. The capability of the motor to switch to various speeds permits, with reference to the spur-gear system 6,7 and the low friction slide bars 3, 34, both a fine-adjustable feed and also a quick return of the tool. The control means for this or for an automatic working sequence are known and, therefore, do not need to be described. They also are not shown. To maintain the vertical carriage in a certain position also conventional and, therefore, not shown devices, for example hydraulic clamping devices, are provided.

The slide bars 3, 34 are, due to the tool 14 which is arranged above the stationarily received workpiece 20,35, mounted sufficiently high, that they lie substantially outside of the chip area. With this it is assured that chips cannot settle at least on the sections which are used during a working cycle and thus wear of these guideways cannot occur. The rotary clamping mechanism 11 of the tool head and the rotary clamping mechanism 46 of the adjusting carriage also lie above the chip area and can thus not become contaminated with chips.

FIGS. 7 to 11 illustrate a further embodiment of a machine on which all known gear-shaving methods can be performed. The design of the machine corresponds substantially with the design described above with respect to FIGS. 1 and 2. The adjusting carriage is identified by the reference numeral 70. The adjusting carriage 70 consists substantially of three parts which are relatively movably arranged to one another: a swivel plate 71, a guide carrier 72 and a feed carriage 73 (see also FIG. 9). That which concerns the tool head which is pivotal about a vertical axis in a clamping mechanism 11 in the so-called adjusting carriage 70 or in the feed carriage 73 is valid for what was said above with respect to the adjustment of the crossed-axes angle $\phi$ in FIG. 5. The swivel plate 71 is supported for pivotal movement about a vertical axis and is secured in a rotary clamping mechanism 74 in the vertical carriage 4 and which will yet be described. With this structure the feed direction 75, 75', 75" (FIG. 5) of the tool 14 can be adjusted as desired during parallel, diagonal or underpass shaving. The guide carrier 72 is tiltably suspended about a horizontal axis 77 on axles 76 on the swivel plate 71. The guide carrier 72 supports on its underside in an initially tensioned longitudinal guideway 78 the feed carriage 73. Initially tensioned longitudinal guideways are known for example as combined rolling/sliding guideways and, therefore, do not need to be described in greater detail. The longitudinal guideway 78 is directed transversely to the axis 77 of the axle 76. Also the longitudinal guideway 78 is mounted, due to the tool 14 being arranged above the stationarily received workpiece 20, sufficiently high that it lies substantially outside of the chip area. The rotary clamping mechanism 74 of the swivel plate also lies above the chip area and thus cannot become contaminated with chips.

Figure 10:
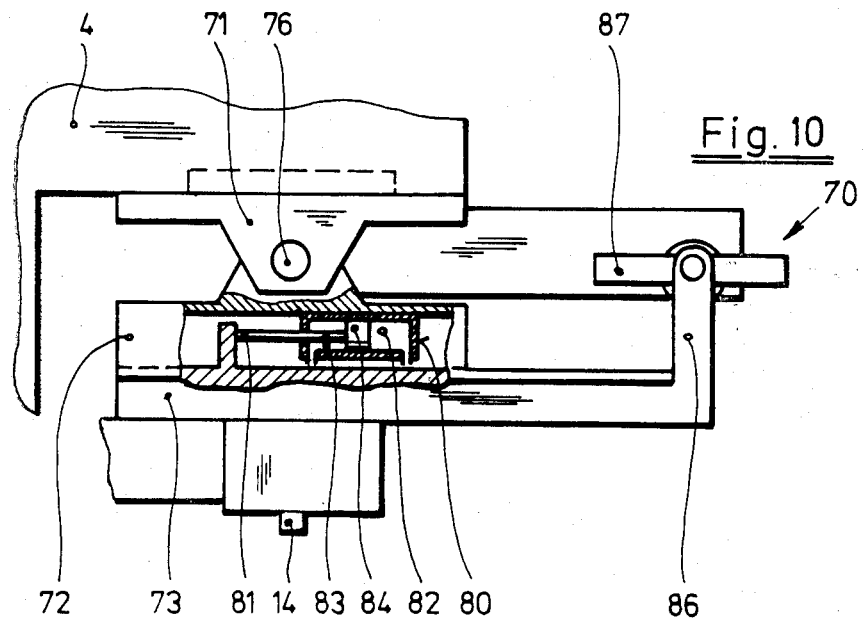
FIG. 10 is a simplified cross-sectional illustration of the adjusting carriage.

The rotary clamping mechanism 74 of the adjusting carriage 70 is principally designed identical to the rotary clamping mechanism 11 and is applicable hereto. Inasfar as the connecting parts of the rotary clamping mechanisms 11 and 46 differ, the corresponding reference numerals are placed in parentheses in FIG. 5. Of course, the initial tensioning force of the spring 56 must here also be larger, since the downwardly directed weight force is here larger. The stepping motor 5 feeds the tool to the workpiece in the sense of a reduction or enlargement of the spacing between the geometric centers of the workpiece and the tool. The capability of the motor to change to various speeds permits with reference to the spur-gear system 6,7 and the low friction slide bars 3 both a fine adjustable feed and also a quick return of the tool. To maintain the vertical carriage in a certain position, also known and therefore not illustrated devices, for example hydraulic clamping devices, are provided. To produce the feed movement 75, 75', 75" (FIG. 5), a double-acting hydraulic cylinder 80 is provided in the guide carrier 72, the piston rod 81 of which is connected to the feed carriage 73 (FIG. 10). Depending on which of the two cylinder chambers 82 and 83 is filled with pressurized oil, the piston 84 is moved to the left or to the right. The feed carriage 73 also carries out this movement. In this manner, it is possible to move the tool 14, for example a shaving gear, back and forth over the entire width of the workpiece. The control means for this and for the feeding of the tool to the workpiece in the sense of a center distance reduction and vice versa or for an automatic working sequence are known and, therefore, do not need to be described. They are also not illustrated.

Figure 9:
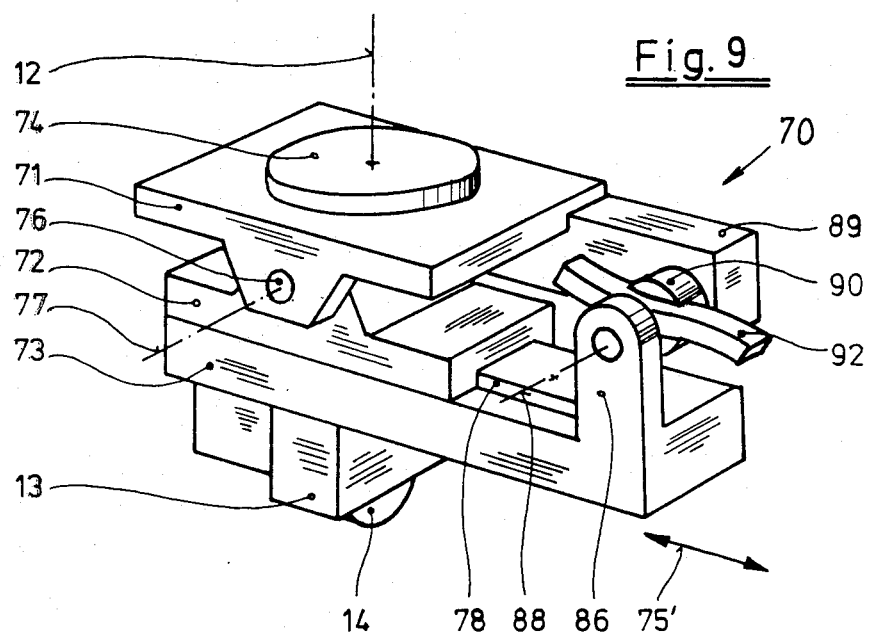
FIG. 9 is a three-dimensional illustration of the adjusting carriage.
Figure 11:
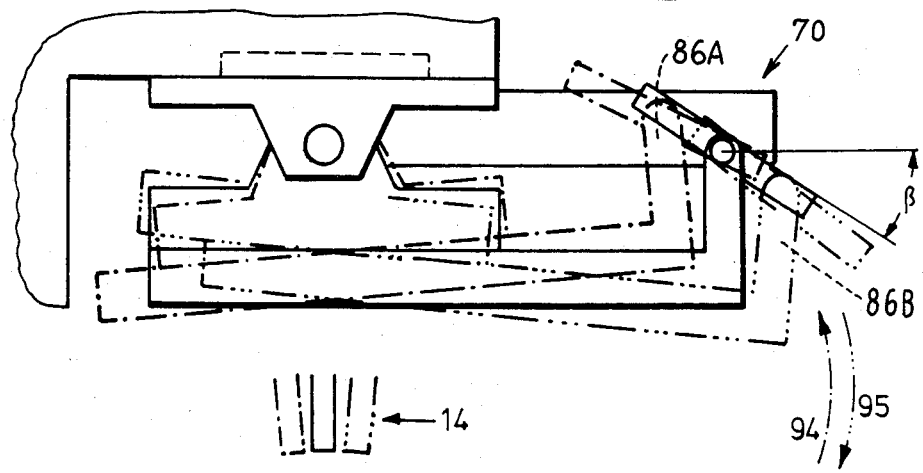
FIG. 11 schematically illustrates the adjustment carriage with various positions of the feed carriage.
Figure 12:
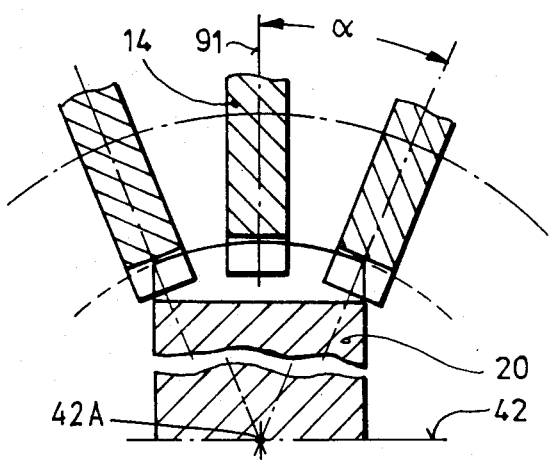
FIG. 12 schematically illustrates the tool in various positions at a normal crowning.

In order to be able to produce crowned teeth on the workpiece 20 during the feed movement 75, 75', 75" of the tool 14, a simple device is mounted on the adjusting carriage 70. The feed carriage 73 has at one end an upwardly directed arm 86, at the free end of which a guide rule 87 is mounted. The guide rule is pivotal about a horizontal axis 88, which extends parallel to the horizontal axis 77, and can be fixed on the arm 86 (FIG. 9). The swivel plate 71 has an arm 89, at the free end of which is freely rotatably hinged a main driving link 90 having a slot therein. The guide rule 87 is guided in the slot in the main driving link 90. When the guide rule is adjusted horizontally and fixedly clamped as in FIG. 10, the feed carriage 73 carries out a normal, rectilinearly extending back and forth movement. However, if the guide rule, as is illustrated in FIG. 11, is adjusted so that it is inclined in a clockwise direction at any desired selectable angle $\beta$ (FIG. 11), then the following happens: During a movement of the feed carriage 73 to the left, the arm 86 is lifted to the position 86A in FIG. 11 due to the link guide of the guide rule 87, however, at the same time is also moved to the left. Due to the suspension of the feed carriage 73 with the guide carrier 72 on the swivel plate 71, the feed carriage 73 and thus also the guide carrier carry out a tilting movement 94 in a counterclockwise direction. During movement of the feed carriage to the right, the arm 86, in turn, is lowered to the position 86B in FIG. 11, the feed carriage 73 and the guide carrier 72 carry out a tilting movement 95 in a clockwise direction. The tilting movement of the feed carriage 73 causes an inclined position of the tool 14 relative to the workpiece. This inclined position is also identified as camber. The angle $\alpha$ of the camber (FIG. 12) can be varied by changing the angle $\beta$, at which the guide rule is inclined.

Figure 13:
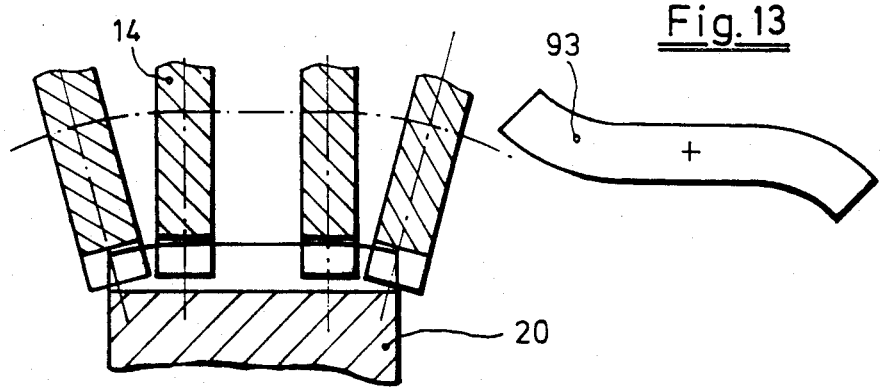
FIG. 13 illustrates a special form of the crowning action and a guide rule which can be used therefor.

In the case of most workpieces having crowned teeth, the plane 91 of rotation of the tool 14 is directed toward the center 42A of the workpiece. In particular in the case of workpieces having a small diameter or in the case of wide workpieces, this normal crowning cannot be achieved with a straight guide rule 87. For such cases, use of guide rules 92 (FIGS. 9 and 13) are advisable which are oppositely curved from the center toward the ends thereof. These guide rules adjacent the end of the back and forth movement enhance or enlarge the camber angle α. With these and similarly curved guide rules, it is possible to achieve also special forms of crowning. An example for this is indicated in FIG. 13, where also the suitable guide rule 93 is illustrated. Also a one-sided crowning or conical tooth shapes can be created by means of other suitable guide rules.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a machine for the automated precision working of tooth surfaces on toothed workpieces, comprising frame means, a rotatingly drivable gearlike tool which is arranged substantially above the workpiece on said frame means and including first means supporting said tool for movement into a tooth engaging relation with said workpiece and for effecting a center distance change between the centers of said tool and said workpiece, second means for adjusting a crossed-axes angle between said tool and said workpiece, third means for driving said tool for rotation and including a stationary drive motor mounted on said frame means, a transmission means connecting said drive motor to said tool, and a fourth means for supporting said workpiece, the improvement comprising wherein:

(a) said first means is provided on said frame means and said second means is provided on said first means for facilitating adjustment of said tool, said first and said second means both being arranged substantially above said workpiece and having no portion thereof extending below said workpiece;
whereby chips and the like formed during an automated working of said workpiece will be incapable of jamming and/or creating excessive wear of said first and second means;

(b) said frame means consists of a base and a vertical column which is arranged at one end of said base and is fixedly connected thereto, said fourth means consists of a longitudinal guideway which extends from said vertical column to the other end of said base on said base for directly receiving a pair of chucking devices for said workpiece thereon and on axially opposite sides thereof, said chucking devices being adjustable in a horizontal direction along said guideway and can be fixedly oriented on said guideway, said chucking devices supporting said workpiece for rotation and while simultaneously maintaining said workpiece axially stationary, and the axis of rotation of said workpiece, when supported on said chucking devices, extends parallel to said guideway and interacts said vertical column;

(c) said first means includes a vertically movable vertical carriage supported on said vertical column;

(d) said vertical carriage is mounted on a side of said column facing the other end of said base;

(e) said second means includes a horizontally divided adjusting carriage which is mounted on the underside of the said vertical carriage, which adjusting carriage consists of an upper part which is secured to said vertical carriage and a lower part which is pivotally mounted through a rotary clamping mechanism for movement about a horizontal axis, said horizontal axis extending at least approximately through the tooth engaging region of said tool and said workpiece, and further perpendicularly both with respect to a common normal to the axis of said tool and the axis of said workpiece and with respect to the axis of said workpiece; and (f) said second means further includes a tool head mounted on the underside of said lower part in a further rotary clamping mechanism having a vertical pivot axis and in which the drivingly rotatable tool is supported, the axis of rotation of said tool being adjusted in a selectable angle ($\phi$) to effect a crossing of the axis between said workpiece and said tool and can be secured on said adjusting carriage.

2. The machine according to claim 1, wherein said further rotary clamping mechanism includes a spring means for initially tensioning said further rotary clamping mechanism in an upward direction, and wherein the initial tensioning force is greater than the weight of the structural parts carried by said further rotary clamping mechanism.

3. The machine according to claim 1, wherein said drive motor for driving said tool is arranged fixedly on said column and said transmission means includes a Cardan shaft.

4. The machine according to claim 1, wherein said lower part is a feed carriage which, aside from facilitating an inclination of the tool axis relative to the workpiece axis about said horizontal axis, includes means for facilitating a back-and-forth movement of said tool in a preselectably adjustable direction which lies in a plane parallel with the tool axis and perpendicular to said horizontal axis.

* * * * *